United States Patent
Yang et al.

(10) Patent No.: US 12,475,877 B2
(45) Date of Patent: Nov. 18, 2025

(54) METHOD, DEVICE, AND COMPUTER PROGRAM PRODUCT FOR TEXT TO SPEECH

(71) Applicant: Dell Products L.P., Round Rock, TX (US)

(72) Inventors: Wenbin Yang, Shanghai (CN); Zijia Wang, WeiFang (CN); Jiacheng Ni, Shanghai (CN); Zhen Jia, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 382 days.

(21) Appl. No.: 17/991,443

(22) Filed: Nov. 21, 2022

(65) Prior Publication Data

US 2024/0185830 A1    Jun. 6, 2024

(30) Foreign Application Priority Data

Oct. 20, 2022    (CN) .......................... 202211288200.2

(51) Int. Cl.
*G10L 13/10*    (2013.01)
*G10L 13/02*    (2013.01)
(Continued)

(52) U.S. Cl.
CPC .............. *G10L 13/02* (2013.01); *G10L 21/10* (2013.01)

(58) Field of Classification Search
CPC ....... G10L 13/02; G10L 21/10; G10L 13/033; G10L 13/10
See application file for complete search history.

(56) References Cited

U.S. PATENT DOCUMENTS

2024/0290316 A1*  8/2024  Gururani ................. A63F 13/53

FOREIGN PATENT DOCUMENTS

CN    111837178 A  * 10/2020  ............. G06F 40/58
CN    112397083 A  *  2/2021  ............. G10L 17/14
(Continued)

OTHER PUBLICATIONS

C. Deng, Y. Chen and H. Deng, "One-Shot Voice Conversion Algorithm Based on Representations Separation," in IEEE Access, vol. 8, pp. 196578-196586, 2020, doi: 10.1109/ACCESS.2020.3034253. (Year: 2020).*

(Continued)

*Primary Examiner* — Paras D Shah
*Assistant Examiner* — Mulugeta Tuji Dugda
(74) *Attorney, Agent, or Firm* — Ryan, Mason & Lewis, LLP

(57) ABSTRACT

Embodiments of the present disclosure relate to a method, a device, and a computer program product for text to speech. The method includes encoding a reference waveform of a first speaker to obtain an encoded style feature separated from a second speaker. The method further includes transferring the encoded style feature to a spectrogram obtained by encoding an input text, to obtain a style transferred spectrogram. The method further includes converting the style transferred spectrogram into a time-domain speech waveform. According to the method for text to speech in the present disclosure, a comparative learning framework can also flexibly and effectively synthesize speech with a style of a target speaker, thus realizing lightweight speech style transfer, making it possible to learn high-quality and recognizable features of speech synthesis, and realizing effective speaker feature learning. In addition, the model will be beneficial to other downstream tasks.

18 Claims, 4 Drawing Sheets

(51) Int. Cl.
*G10L 13/033* (2013.01)
*G10L 21/10* (2013.01)

(56) References Cited

FOREIGN PATENT DOCUMENTS

| | | | | |
|---|---|---|---|---|
| CN | 113782013 A | * | 12/2021 | ......... G10L 21/0272 |
| CN | 110738995 B | * | 11/2022 | ............. G10L 15/22 |
| JP | WO2009057739 A1 | * | 3/2011 | ............. G10L 15/07 |

OTHER PUBLICATIONS

Yanmin Qian, Xuankai Chang, Dong Yu, "Single-channel multi-talker speech recognition with permutation invariant training," Speech Communication, vol. 104, Sep. 7, 2018 (Year: 2018).*

A. Oord et al., "WaveNet: A Generative Model for Raw Audio," arXiv:1609.03499v2, Sep. 19, 2016, 15 pages.

J. Shen et al., "Natural TTS Synthesis by Conditioning WaveNet on mel Spectrogram Predictions," IEEE International Conference on Acoustics, Speech and Signal Processing, arXiv:1712.05884v2, Feb. 16, 2018, 5 pages.

Y. Chen et al., "Sample Efficient Adaptive Text-to-Speech," The International Conference on Learning Representations, arXiv:1809.10460v3, Jan. 16, 2019, 16 pages.

E. Nachmani et al., "Fitting New Speakers Based on a Short Untranscribed Sample," International Conference on Machine Learning, arXiv:1802.06984v1, Feb. 20, 2018, 9 pages.

* cited by examiner

METHOD, DEVICE, AND COMPUTER PROGRAM PRODUCT FOR TEXT TO SPEECH

RELATED APPLICATION

The present application claims priority to Chinese Patent Application No. 202211288200.2, filed Oct. 20, 2022, and entitled "Method, Device, and Computer Program Product for Text to Speech," which is incorporated by reference herein in its entirety.

FIELD

Embodiments of the present disclosure generally relate to the field of speech technologies, and in particular, to a method, a device, and a computer program product for text to speech.

BACKGROUND

Text to Speech (TTS) technology aims to synthesize understandable natural speech for a given text, and such technology is widely used and has been extended to multi-speaker scenarios. In practical applications, it is expected that a TTS model can generate high-quality speech for several short audio samples from a given speaker. However, improved TTS models and associated techniques are needed that can achieve better adaptation quality.

SUMMARY

A method, a device, and a computer program product for text to speech are provided in embodiments of the present disclosure.

In one aspect of the present disclosure, a method for text to speech is provided. The method includes: encoding a reference waveform of a first speaker to obtain an encoded style feature separated from a second speaker; transferring the encoded style feature to a spectrogram obtained by encoding an input text, to obtain a style transferred spectrogram; and converting the style transferred spectrogram into a time-domain speech waveform.

In another aspect of the present disclosure, an electronic device is provided. The electronic device includes a processing unit and a memory, where the memory is coupled to the processing unit and stores instructions. The instructions, when executed by the processing unit, cause the electronic device to perform the following actions: encoding a reference waveform of a first speaker to obtain an encoded style feature separated from a second speaker; transferring the encoded style feature to a spectrogram obtained by encoding an input text, to obtain a style transferred spectrogram; and converting the style transferred spectrogram into a time-domain speech waveform.

In still another aspect of the present disclosure, a computer program product is provided. The computer program product is tangibly stored in a non-transitory computer-readable medium and includes computer-executable instructions. The computer-executable instructions, when executed by computer, cause the computer to perform the method or process according to embodiments of the present disclosure.

This Summary is provided to introduce related concepts in a simplified manner, which will be further described in the Detailed Description below. The Summary is neither intended to identify key features or essential features of the present disclosure, nor intended to limit the scope of embodiments of the present disclosure.

BRIEF DESCRIPTION OF THE DRAWINGS

By description of example embodiments of the present disclosure, provided in more detail herein with reference to the accompanying drawings, the above and other objectives, features, and advantages of the present disclosure will become more apparent. In the example embodiments of the present disclosure, the same reference numerals generally represent the same elements.

DETAILED DESCRIPTION

Figure 1:
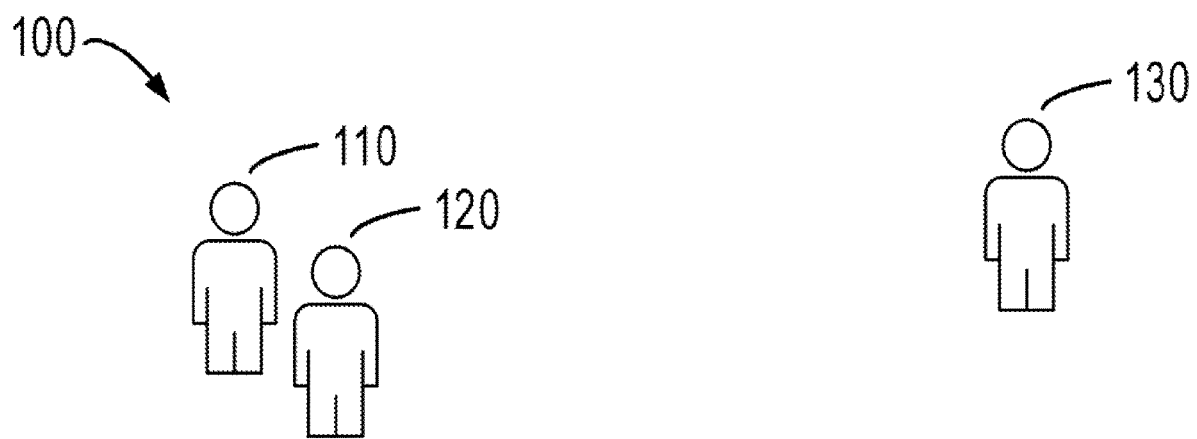
FIG. 1 shows a schematic diagram of an example environment for text to speech according to an embodiment of the present disclosure.

Illustrative embodiments of the present disclosure will be described in more detail below with reference to the accompanying drawings. Although some specific embodiments of the present disclosure are shown in the accompanying drawings, it should be understood that the present disclosure may be implemented in various forms, and should not be limited to the embodiments set forth herein. Rather, these embodiments are provided to make the present disclosure more thorough and complete and to fully convey the scope of the present disclosure to those skilled in the art.

The term "include" and variants thereof used in this text indicate open-ended inclusion, that is, "including but not limited to." Unless specifically stated, the term "or" means "and/or." The term "based on" means "based at least in part on." The terms "an example embodiment" and "an embodiment" indicate "at least one example embodiment." The term "another embodiment" indicates "at least one additional embodiment." The terms "first," "second," and the like may refer to different or identical objects, unless otherwise specifically indicated that they indicate different objects.

Text to Speech (TTS) or speech synthesis aims to synthesize understandable natural speech for a given text, which is an important topic in fields of speech, language, and machine learning, and is widely used. A TTS model can synthesize natural voice when being trained with a large number of high-quality single-speaker recordings, and has been extended to multi-speaker scenarios.

With the rapid development of the TTS model based on a neural network, personalized speech generation has attracted more and more attention in different application scenarios such as personal assistant, news broadcast, and audio navigation. Text to speech for custom speech services aims to adjust a source TTS model, so as to use a small amount of speech from a target speaker to synthesize a personalized speech for the speaker. In practical applications, it is expected that a TTS model can generate high-quality speech for several short audio samples from a given speaker. However, traditional methods need to train the model on a large data set for multiple speakers and adjust the TTS model slightly; otherwise, the adaption quality achieved is low, and it is difficult to generate high-quality personalized speech, that is, the generated speech has a poor personal style. When the TTS model is adjusted slightly, the adaptability of the TTS model is usually low for those "new" speakers (that is, those speakers whose features are not known by the TTS model), especially when the length of a reference speech is short. To solve this problem, the present disclosure provides a new method to flexibly synthesize speech and learned speaker features, and provides a modified linear projection to improve the adaptability of the TTS model to new speakers.

Specifically, an embodiment of the present disclosure provides an Adaptive Speech with Oil Water Separation (AS-OWS) method, which not only can flexibly synthesize speech and learned speaker features to generate high-quality speech, but also provides a modified linear projection to effectively adapt to new speakers, thereby improving the adaptability of the TTS model to new speakers. A key idea underlying this method is using an "oil water separation" (OWS) model to learn features of a target speaker and distinguish the target speaker from other speakers. Then, by using the lightweight improved linear projection in a speaker feature space, an OWS based comparative learning framework can flexibly and effectively synthesize the speech with a style of the target speaker, even from a few speech audios or a short length reference speech audio; therefore, lightweight speech style transfer can be achieved, and high-quality and recognizable features of speech synthesis can be learned, thereby realizing effective speaker feature learning. In addition, the model will be beneficial to other downstream tasks. For example, with this method, personal assistants and news broadcasts can be used in Metaverse applications with only minor modifications. Through this method, a flexible framework can also be implemented.

The basic principles and some example implementations of the present disclosure are illustrated below with reference to FIG. 1 to FIG. 6. It should be understood that these example embodiments are given only to enable those skilled in the art to better understand and thus implement embodiments of the present disclosure, and are not intended to limit the scope of the present disclosure in any way.

FIG. 1 shows a schematic diagram of example environment 100 for text to speech according to an embodiment of the present disclosure. As shown in FIG. 1, first speaker 110 and second speaker 120 may be included in example environment 100. First speaker 110 is close to second speaker 120 in spatial position, so style features of speeches they emit may have the same or highly similar distribution variance.

In some embodiments, example environment 100 may also include third speaker 130. First speaker 110 and third speaker 130 are far away from each other in spatial position and have a large distance therebetween; therefore, style features of their speeches have different distribution variances. It should be understood that the number of speakers included in example environment 100 may be one (for example, first speaker 110 speaks to himself or herself) or more (for example, two or more persons, including a case of making a call or network speech, an offline conference, or an online audio and video conference). When example environment 100 includes multiple speakers, other speakers may be far away from first speaker 110, such as third speaker 130 shown in FIG. 1, or close to first speaker 110, such as second speaker 120 shown in FIG. 1.

Figure 2:
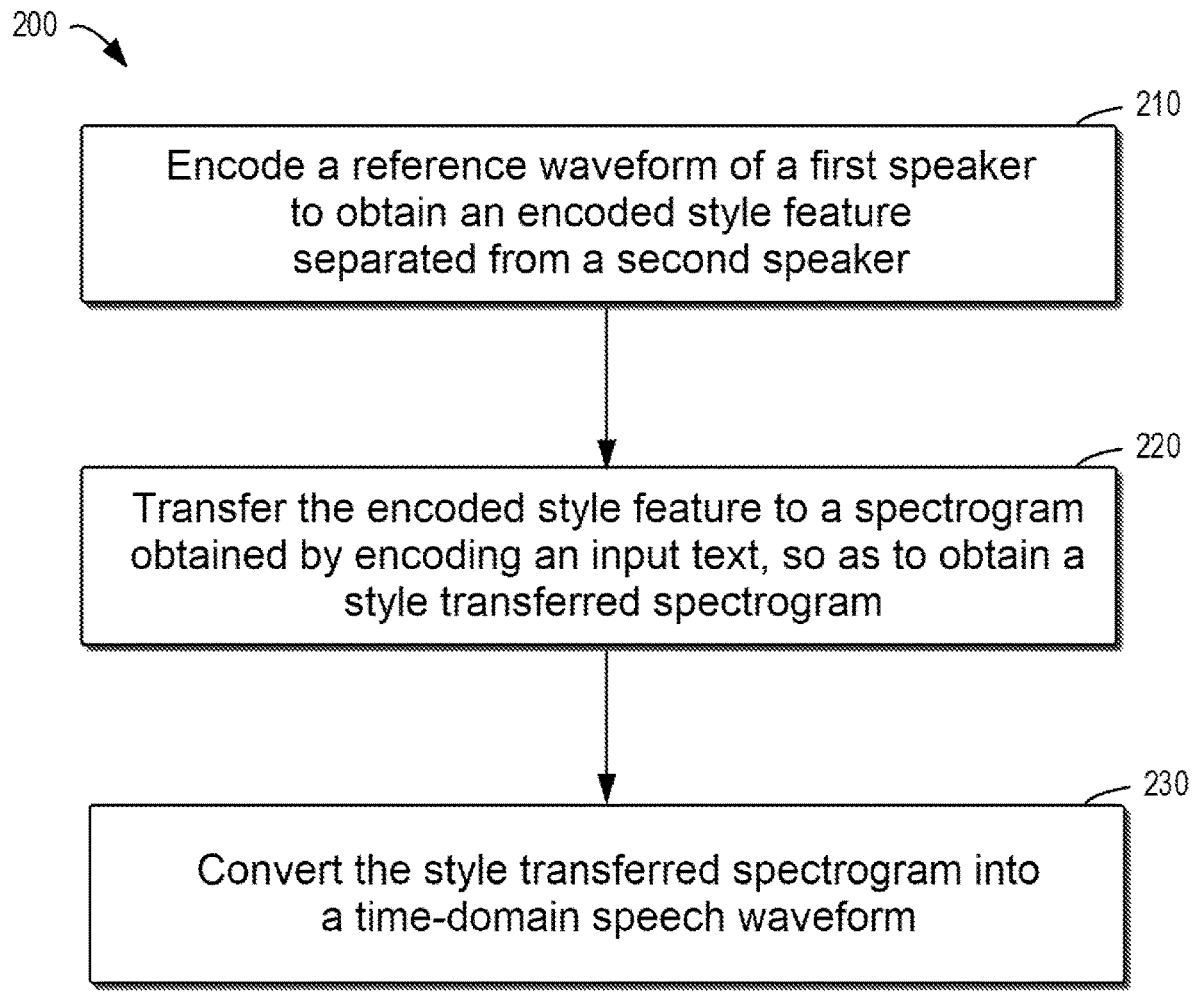
FIG. 2 shows a flowchart of a method for text to speech according to an embodiment of the present disclosure.

FIG. 2 shows a flowchart of example method 200 for text to speech according to an embodiment of the present disclosure. Example method 200 will be described with reference to FIG. 1 and FIG. 2.

As shown in FIG. 2, in example method 200, in 210, a reference waveform of the first speaker is encoded to obtain an encoded style feature separated from the second speaker. For example, with reference to FIG. 1, the reference waveform of first speaker 110 may be encoded through the OWS model included in the TTS model to obtain the encoded style features separated from second speaker 120. In some embodiments, second speaker 120 may be a speaker who has been recognized and for whom an OWS model is known. The reference waveform may be several short audio samples or a reference speech audio from a given speaker (for example, first speaker 110 to be learned in the example shown in FIG. 1).

In 220, by migrating the encoded style feature to a spectrogram obtained by encoding an input text, a style transferred spectrogram is obtained. In some embodiments, the spectrogram may be a mel-spectrogram.

In 230, the style transferred spectrogram is converted into a time-domain speech waveform. The time-domain speech waveform is an output speech with a style feature of the first speaker (that is, with a personalized feature of the first speaker).

Figure 3:
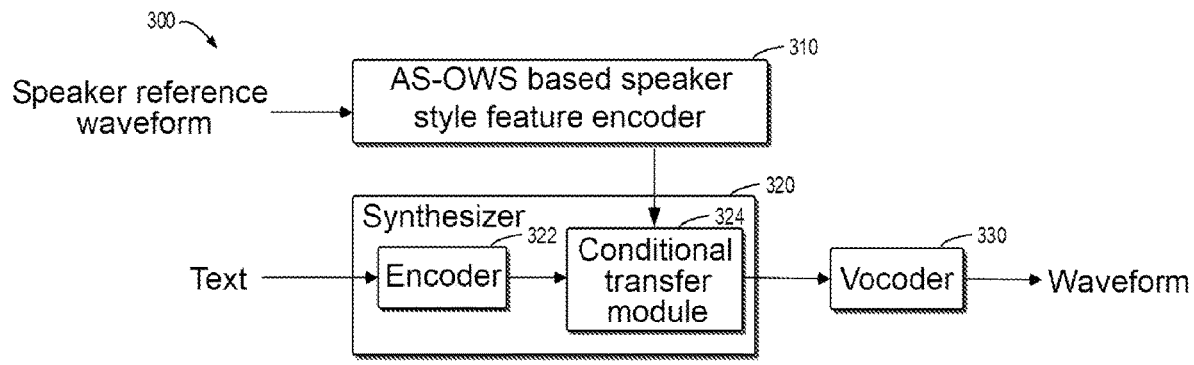
FIG. 3 shows a schematic architectural diagram of a system for text to speech according to an embodiment of the present disclosure.

FIG. 3 shows a schematic diagram of example method 300 for text to speech according to an embodiment of the present disclosure. FIG. 3 is described with additional reference to FIG. 1 and FIG. 2. As shown in example method 300 of FIG. 3, AS-OWS based speaker style feature encoder 310 is used for processing a speaker reference waveform (an internal architecture and internal processing of AS-OWS based speaker style feature encoder 310 will be described in detail later with reference to FIG. 5), to obtain the encoded style feature separated from other known speakers. Encoding the speech of the speaker includes generating a vector of a predetermined dimension from the speech of the speaker.

In addition, synthesizer 320 shown in FIG. 3 includes encoder 322 and conditional transfer module 324. A text is input to encoder 322 for encoding to obtain a spectrogram, and the obtained spectrogram is input to conditional transfer module 324. In some embodiments, the spectrogram obtained by encoding with encoder 322 is, for example, a mel-spectrogram.

In addition, as shown in FIG. 3, the encoded style feature output by AS-OWS based speaker style feature encoder 310 is also input into conditional transfer module 324, so that the style transferred spectrogram may be obtained through conditional transfer module 324. For example, the mel-spectrogram, after output by encoder 322, passes through conditional transfer module 324 to obtain the style transferred mel-spectrogram.

The style transferred spectrogram output by conditional transfer module 324 is input to vocoder 330 for encoding to obtain the time-domain speech waveform. The time-domain speech waveform is a speech output corresponding to the text input to encoder 322, and the speech output has the style feature obtained by AS-OWS based speaker style feature encoder 310. Therefore, the style feature of the speaker when speaking can be reflected in the time-domain speech waveform output by vocoder 330, so that personalized or customized text to speech can be realized.

Figure 4:
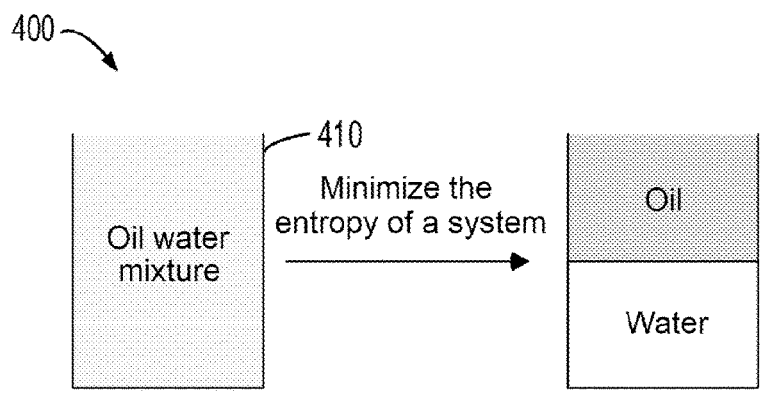
FIG. 4 shows a schematic architectural diagram of an oil-water separation phenomenon based on an oil-water separation technology used in a system for text to speech according to an embodiment of the present disclosure.

FIG. 4 shows a schematic architectural diagram of oil-water separation phenomenon 400 based on an oil-water separation technology used in a system for text to speech according to an embodiment of the present disclosure. As shown in FIG. 4, container 410 is filled with an oil water mixture.

Entropy is a physical quantity that describes the degree of chaos in a system. As shown in FIG. 4, it can be clearly seen that the degree of chaos of the oil water mixture is significantly higher than that of an oil water separated liquid. Inspired by this phenomenon, a comparative learning paradigm called "oil water separation" (OWS) phenomenon heuristic method is provided in illustrative embodiments disclosed herein. The present disclosure is based on the comparative learning paradigm.

In a process of the entropy of an oil water mixture system gradually decreasing, the oil and water in the mixture gradually separate. When the entropy of the oil water mixture system becomes minimum and remains stable, the oil and water are in a separated state. As shown by an arrow on the right, the density of the oil (for example, the density of kerosene is 0.8 g/cm$^3$, the density of vegetable oil is 0.9 g/cm$^3$, the density of gasoline is 0.71 g/cm$^3$, the density of edible oil is about 0.92 g/cm$^3$ to 0.93 g/cm$^3$, and the density of diesel is 0.84 g/cm$^3$) is lower than the density of water (1 g/cm$^3$), and therefore, in container 410, under the action of gravity, the oil and water are in the separated state in which the oil is located above and the water is located below, and the separated state will remain stable without the influence of an external force.

Based on the above oil water separation phenomenon, in the text to speech solution using "oil water separation" as provided in the present disclosure, the AS-OWS based speaker style feature encoder is used for obtaining the style feature of the new speaker that is different from other speakers, and obtaining, based on this, the time-domain speech waveform with its own style feature, thereby realizing personalized or customized text to speech. The internal structure and operation of the AS-OWS based speaker style feature encoder will be described below with reference to FIG. 5.

Figure 5:
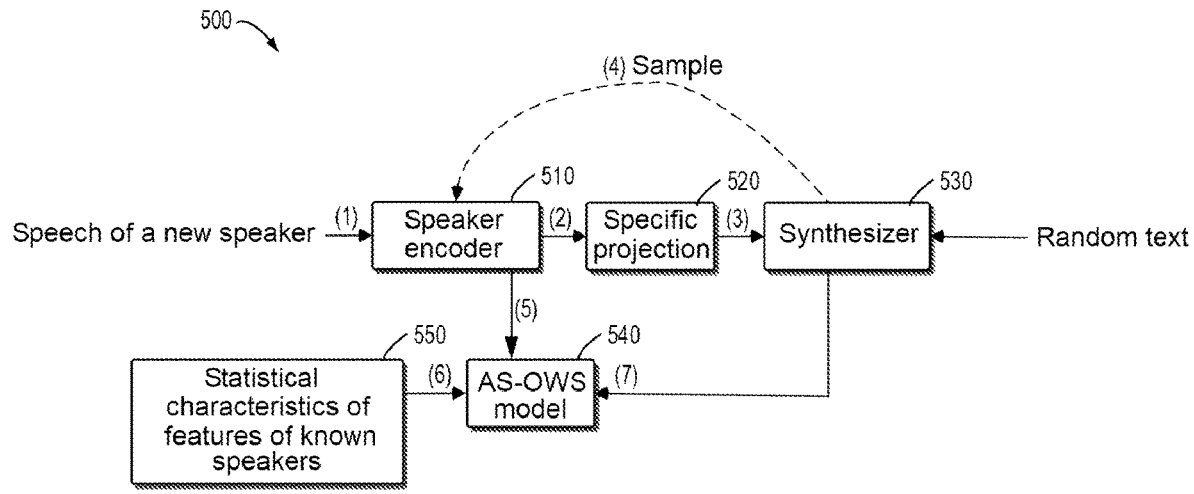
FIG. 5 shows a schematic diagram of an example self-adaptive architecture of a system for text to speech according to an embodiment of the present disclosure.

FIG. 5 shows a schematic diagram of example self-adaptive architecture 500 for text to speech according to an embodiment of the present disclosure. The example self-adaptive architecture 500 may correspond, for example, to AS-OWS based speaker style feature encoder 310 shown in FIG. 3. As shown in FIG. 5, in example self-adaptive architecture 500, the speech of the new speaker is input, as shown at (1), into speaker encoder 510 for encoding. Also, a random text is input to synthesizer 530. Synthesizer 530 may also be, for example, synthesizer 320 as shown in FIG. 3, illustratively including an encoder therein. An encoded output of speaker encoder 510 is applied as an input to specific projection 520, as shown at (2), and an output of specific projection 520 is applied as an input to synthesizer 530, as shown at (3), and is synthesized, together with the encoder output generated in the encoder of synthesizer 530 after the random text is input to synthesizer 530.

The output of synthesizer 530 is sampled and fed back to speaker encoder 510, as shown at (4), and is also applied as input to AS-OWS model 540, as shown at (7). The AS-OWS model 540 is a feature separation encoder, which uses an AS-OWS based feature learning method to generate a style feature that distinguishes the new speaker from other speakers (or known speakers). The AS-OWS based feature learning method is essentially a feature separation algorithm, which is based on the aforementioned "oil water separation" phenomenon. The encoded output of speaker encoder 510 is also input to AS-OWS model 540, as shown at (5). In addition, statistical characteristics 550 of features of known speakers are also input into AS-OWS model 540, as shown at (6). In this way, in AS-OWS model 540, AS-OWS based feature learning is carried out based on statistical characteristics 550 of the features of known speakers, the encoded output of speaker encoder 510, and the output of synthesizer 530, to obtain style feature information of the new speaker, such as the encoded style feature output by AS-OWS based speaker style feature encoder 310 shown in FIG. 3, or the encoded style feature described in 210 in FIG. 2.

In the above OWS based feature learning, an OWS loss is used for learning a specific projection of the new speaker. How to perform feature learning to obtain the style feature of the new speaker will be described in detail below with reference to FIG. 1 to FIG. 5.

The speaker encoder (such as AS-OWS based speaker style feature encoder 310 shown in FIG. 3) is used for adjusting the synthesizer (such as synthesizer 320 shown in FIG. 3) according to a reference speech signal from the target speaker. A multi-speaker TTS system may be extended to the new speaker by using a representation that captures the style of the speaker. The learning framework of the present disclosure is based on the OWS loss. The OWS loss comes from the essence of "oil water separation." First, a weight between features of any two speakers $\omega_i$ and $\omega_j$ may be calculated by the following Equation (1):

$$W_{ij} = \frac{(\omega_i^T \omega_j)^2}{|\omega_i||\omega_j|} \tag{1}$$

where $\omega_i$ denotes a feature of the ith speaker in the scenario, and $\omega_j$ denotes a corresponding feature of the jth speaker in the scenario. For example, in the example shown in FIG. 1, $\omega_i$ may denote first speaker 110, and $\omega_j$ may denote second speaker 120, where during learning of $\omega_i$, $\omega_j$ may be known by AS-OWS model 540 because it has been learned by AS-OWS model 540.

Then, a predicted indicator vector $h \in \mathbb{R}^{(N_p+N_n)\times 1}$ is defined as:

$$h_q = \begin{cases} 0 & \omega(q) \notin A \\ \frac{1}{\sqrt{vol(A)}} & \omega(q) \in A \end{cases} \tag{2}$$

where $A \in \mathbb{R}^{N_p \times N_p}$ denotes a sub-graph representing the feature of the target speaker (for example, the ith speaker as described above), and $N_p$ and $N_n$ denote dimension sizes of features of the target speaker and another speaker (for example, the jth speaker as described above).

Therefore, the OWS loss may be defined as:

$$l_{OWS} = \sum_{x \in \mathcal{D}} [tr(h^T L h)] = \sum_{x \in \mathcal{D}} \left[ \frac{cut(A, \overline{A})}{vol(A)} \right] \tag{3}$$

where tr( ) denotes a trace operation of a matrix, $\overline{A}$ denotes a sub-graph of the feature of the other speaker (for example, the jth speaker as described above), $\mathcal{D}$ denotes a dataset, and cut( ) and vol( ) denote a cut operation and a volume operation, respectively, defined in the graph. As can be seen, the OWS loss is based on the sub-graph of the target speaker $A \in \mathbb{R}^{N_p \times N_p}$ and the sub-graph $\overline{A}$ of the other speaker. The term vol(A) is defined as the dimension size of the sub-graph $A \in \mathbb{R}^{N_p \times N_p}$, that is:

$$vol(A) = \sum_{i \in A} W_{ij} \quad (4)$$

In addition, for two sets A and B that are not necessarily non-intersecting (that is, they may intersect), a cut fraction is defined as:

$$cut(A, B) = \sum_{i \in A, j \in B} W_{ij} \quad (5)$$

The OWS concept is natural and stable for feature learning. The encoded style feature presentation that is output after feature learning in AS-OWS model 540 shown in FIG. 5 is directly applicable for adjusting a synthesizer. The encoded style feature output by AS-OWS based speaker style feature encoder 310 shown in FIG. 3 is directly input to conditional transfer module 324 in synthesizer 320.

An embedded vector of the target speaker is connected to the output of the synthesizer encoder (for example, encoder 322 of synthesizer 320 shown in FIG. 3) at each time step. The synthesizer (for example, synthesizer 320 shown in FIG. 3) is trained on paired text transcription and target audio. During the training, a reference signal of the speaker is the same as the target speech.

With respect to vocoder 330 shown in FIG. 3, a sample by sample WaveNet may be used as the vocoder to convert the synthesized spectrogram (for example, mel-spectrogram) style transferred by conditional transfer module 324 into time-domain speech waveform. The synthesized spectrogram style transferred by conditional transfer module 324 can capture all details required for high-quality synthesis, thereby allowing vocoder 330 to be constructed by simply training data from many speakers.

The speaker feature used for synthesis is inferred from audio, and therefore, conditional transfer module 324 may be adjusted by using the audio of the speaker beyond a training set. Some audio clips are sufficient to synthesize a new speech with the corresponding speaker feature. A loss function of the feature learning of the new speaker is given by:

$$L = |v - \mathcal{S}(\omega_p)| + \beta l_{OWS} \quad (6)$$

where $v$ denotes the input speech, $\mathcal{S}(\omega_p)$ denotes the synthesized feature of the new speaker, $\|$ denotes a mean absolute error (MAE) loss, and $\beta$ is a weight that controls the contribution of an OWS loss item. As can be seen, the loss function of the feature learning of the new speaker is based on the OWS loss.

In addition, using multi-speaker features, it can be assumed that the feature of the new speaker has a distribution variance the same as or similar to that of the speaker closest to the new speaker in an original dataset. For example, in the example shown in FIG. 1, it may also be that first speaker 110 is the new speaker, second speaker 120 is the speaker closest to the new speaker, that is, first speaker 110, and first speaker 110 and second speaker 120 have the same distribution variance. Based on the distribution variance, the feature of the new speaker can be sampled more effectively. Therefore, $$\Sigma_{novel} = \Sigma_{near} \quad (7)$$

where $\Sigma_{novel}$ and $\Sigma_{near}$ respectively denote the distribution variance of the features of the new speaker and the speaker closest to the new speaker in the data set. In some embodiments, when learning and training the feature of the new speaker, the feature of the speaker closest to the new speaker is known. That is, the feature of the speaker closest to the new speaker is learned and trained first. After the feature of the speaker closest to the new speaker is known, the new speaker is learned and trained based on the known speaker closest to the new speaker. For example, in the example shown in FIG. 1, second speaker 120 can be learned to know its feature, and then unknown first speaker 110 may be learned based on the feature of second speaker 120 to acquire its style feature.

As above, the OWS based feature learning method is essentially a feature separation algorithm, and its process may be summarized as follows:

1. Inputs are: input speech $v$; statistical characteristics B of features of the known speaker; and the number of training epochs T.
2. An output is: a weight of a specific projection of a new speaker $\theta$.
3. Initialization: pre-trained speaker encoder $\varepsilon$; and synthesizer $\mathcal{S}$.
4. Operations: For each cycle of epoch t from 1 to T, the following steps are performed:
    (1) Use speaker encoder $\varepsilon$ to calculate the speaker feature $\omega_{novel} = \varepsilon(v)$;
    (2) Use the specific projection to obtain a new feature $\omega_p = \mathcal{P}(\omega_{novel})$;
    (3) Transfer the new feature to synthesizer $\mathcal{S}$;
    (4) Run TTS sampling with a random text to obtain voice set $v_{sam}$;
    (5) Substitute voice set $v_{sam}$ into (1) and (2) above to obtain a feature set $\omega_{sam}$;
    (6) Sample features from known speakers to obtain feature set $\omega_{known}$;
    (7) Calculate an MAE loss from $v$ and $\mathcal{S}(\omega_p)$;
    (8) Calculate an OWS loss from $\omega_{sam}$ and $\omega_{known}$; and
    (9) Calculate the loss value in Equation (6) above and optimize $\theta$.

Figure 6:
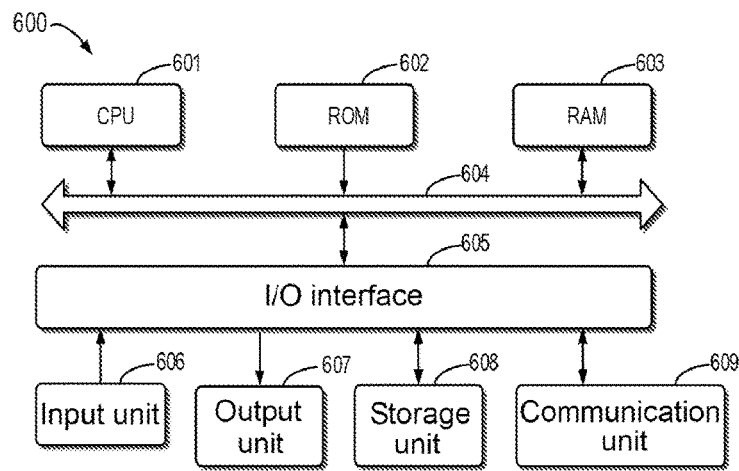
FIG. 6 shows a schematic block diagram of a device that may be configured to implement embodiments of the present disclosure.

FIG. 6 shows a schematic block diagram of device 600 that may be configured to implement an embodiment of the present disclosure. Device 600 may be a device or apparatus described in embodiments of the present disclosure. As shown in FIG. 6, device 600 includes central processing unit (CPU) 601 that may perform various appropriate actions and processing according to computer program instructions stored in read-only memory (ROM) 602 or computer program instructions loaded from storage unit 608 to random access memory (RAM) 603. Various programs and data required for the operation of device 600 may also be stored in RAM 603. CPU 601, ROM 602, and RAM 603 are connected to each other through bus 604. Input/output (I/O) interface 605 is also connected to bus 604.

A plurality of components in device 600 are connected to I/O interface 605, including: input unit 606, such as a keyboard and a mouse; output unit 607, such as various types of displays and speakers; storage unit 608, such as a magnetic disk and an optical disc; and communication unit 609, such as a network card, a modem, and a wireless communication transceiver. Communication unit 609 allows device 600 to exchange information/data with other devices via a computer network, such as the Internet, and/or various telecommunication networks.

The various methods or processes described above may be performed by CPU 601. For example, in some embodiments, the methods can be implemented as a computer software program that is tangibly included in a machine-readable medium such as storage unit 608. In some embodiments, part of or all the computer program may be loaded and/or installed onto device 600 via ROM 602 and/or communication unit 609. When the computer programs are loaded onto RAM 603 and executed by CPU 601, one or more steps or actions of the methods or processes described above may be performed.

In some embodiments, the methods and processes described above may be implemented as a computer program product. The computer program product may include a computer-readable storage medium on which computer-readable program instructions for performing various aspects of the present disclosure are loaded.

The computer-readable storage medium may be a tangible device that may retain and store instructions used by an instruction-executing device. For example, the computer-readable storage medium may be, but is not limited to, an electrical storage device, a magnetic storage device, an optical storage device, an electromagnetic storage device, a semiconductor storage device, or any suitable combination of the above. More specific examples (a non-exhaustive list) of the computer-readable storage medium include: a portable computer disk, a hard disk, a RAM, a ROM, an erasable programmable read-only memory (EPROM or flash memory), a static random access memory (SRAM), a portable compact disc read-only memory (CD-ROM), a digital versatile disc (DVD), a memory stick, a floppy disk, a mechanical encoding device, for example, a punch card or a raised structure in a groove with instructions stored thereon, and any suitable combination of the foregoing. The computer-readable storage medium used herein is not to be interpreted as transient signals per se, such as radio waves or other freely propagating electromagnetic waves, electromagnetic waves propagating through waveguides or other transmission media (e.g., light pulses through fiber-optic cables), or electrical signals transmitted through electrical wires. The computer-readable program instructions described herein may be downloaded from a computer-readable storage medium to various computing/processing devices, or downloaded to an external computer or external storage device via a network, such as the Internet, a local area network, a wide area network, and/or a wireless network. The network may include copper transmission cables, fiber optic transmission, wireless transmission, routers, firewalls, switches, gateway computers, and/or edge servers. A network adapter card or network interface in each computing/processing device receives computer-readable program instructions from a network and forwards the computer-readable program instructions for storage in a computer-readable storage medium in each computing/processing device.

The computer program instructions for performing the operations of the present disclosure may be assembly instructions, Instruction Set Architecture (ISA) instructions, machine instructions, machine-related instructions, microcode, firmware instructions, status setting data, or source code or object code written in any combination of one or more programming languages, including object-oriented programming languages as well as conventional procedural programming languages. The computer-readable program instructions may be executed entirely on a user computer, partly on a user computer, as a stand-alone software package, partly on a user computer and partly on a remote computer, or entirely on a remote computer or a server. In a case where a remote computer is involved, the remote computer can be connected to a user computer through any kind of networks, including a local area network (LAN) or a wide area network (WAN), or can be connected to an external computer (for example, connected through the Internet using an Internet service provider). In some embodiments, an electronic circuit, such as a programmable logic circuit, a field programmable gate array (FPGA), or a programmable logic array (PLA), is customized by utilizing status information of the computer-readable program instructions. The electronic circuit may execute the computer-readable program instructions so as to implement various aspects of the present disclosure.

These computer-readable program instructions can be provided to a processing unit of a general-purpose computer, a special-purpose computer, or another programmable data processing apparatus to produce a machine, such that these instructions, when executed by the processing unit of the computer or another programmable data processing apparatus, generate an apparatus for implementing the functions/actions specified in one or more blocks in the flowcharts and/or block diagrams. The computer-readable program instructions may also be stored in a computer-readable storage medium. These instructions cause a computer, a programmable data processing apparatus, and/or another device to operate in a particular manner, such that the computer-readable medium storing the instructions includes an article of manufacture which includes instructions for implementing various aspects of the functions/actions specified in one or more blocks in the flowcharts and/or block diagrams.

The computer-readable program instructions can also be loaded onto a computer, other programmable data processing apparatuses, or other devices, so that a series of operating steps are performed on the computer, other programmable data processing apparatuses, or other devices to produce a computer-implemented process. Therefore, the instructions executed on the computer, other programmable data processing apparatuses, or other devices implement the functions/actions specified in one or more blocks in the flowcharts and/or block diagrams.

The flowcharts and block diagrams in the accompanying drawings show the architectures, functions, and operations of possible implementations of the device, the method, and the computer program product according to a plurality of embodiments of the present disclosure. In this regard, each block in the flowcharts or block diagrams may represent a module, a program segment, or part of an instruction, the module, program segment, or part of an instruction including one or more executable instructions for implementing specified logical functions. In some alternative implementations, the functions denoted in the blocks may also occur in a sequence different from that shown in the figures. For example, two consecutive blocks may in fact be executed substantially concurrently, and sometimes they may also be executed in the reverse order, depending on the functions involved. It should be further noted that each block in the block diagrams and/or flowcharts as well as a combination of blocks in the block diagrams and/or flowcharts may be implemented by a dedicated hardware-based system executing specified functions or actions, or by a combination of dedicated hardware and computer instructions.

Various embodiments of the present disclosure have been described above. The above description is illustrative, rather than exhaustive, and is not limited to the disclosed various embodiments. Numerous modifications and alterations will be apparent to persons of ordinary skill in the art without departing from the scope and spirit of the illustrated embodiments. The selection of terms as used herein is intended to best explain the principles and practical applications of the various embodiments and their associated improvements, so as to enable persons of ordinary skill in the art to understand the embodiments disclosed herein.

What is claimed is:

1. A method for text to speech, comprising:
encoding a reference waveform of a first speaker in a feature separation encoder of a processor-based machine learning system to obtain an encoded style feature separated from a second speaker, wherein the feature separation encoder implements a feature separation algorithm based on entropy minimization utilizing pair-wise weights computed between features of respective pairs of multiple speakers;
transferring in a synthesizer of the processor-based machine learning system the encoded style feature to a spectrogram obtained by encoding an input text in a text encoder of the synthesizer, to obtain a style transferred spectrogram; and
converting the style transferred spectrogram into a time-domain speech waveform in a vocoder of the processor-based machine learning system;
wherein encoding the reference waveform of the first speaker to obtain the encoded style feature separated from the second speaker comprises:
inputting a feature of the second speaker, an output of a speaker encoder from the first speaker encoded by the speaker encoder, and an output of the synthesizer obtained by passing a random text through the synthesizer, into the feature separation encoder as inputs; and
performing feature learning based on the feature separation algorithm in the feature separation encoder, and encoding the reference waveform of the first speaker, to obtain the encoded style feature separated from the second speaker.

2. The method according to claim 1, wherein encoding the reference waveform of the first speaker comprises:
generating a vector of a predetermined dimension from the reference waveform of the first speaker.

3. The method according to claim 2, wherein encoding the reference waveform of the first speaker further comprises:
calculating, from the vector, a loss value based on the feature separation algorithm, wherein the loss value is based on a feature sub-graph of the first speaker and a feature sub-graph of the second speaker; and
encoding the reference waveform of the first speaker based on the loss value.

4. The method according to claim 1, wherein the second speaker and the first speaker are close to each other in space and have features with the same distribution variance.

5. The method according to claim 3, wherein a loss function of the feature sub-graph of the first speaker is based on the loss value.

6. The method according to claim 1, further comprising:
inputting the output of the speaker encoder, after being subject to a linear projection, into the synthesizer; and
inputting an output of the synthesizer, after being sampled, to the speaker encoder.

7. The method according to claim 1, wherein:
the second speaker and the first speaker speak in the same conversation scenario.

8. An electronic device, comprising:
at least one processing unit; and
memory coupled to the at least one processing unit and storing instructions, wherein the instructions, when executed by the at least one processing unit, cause the electronic device to perform actions comprising:
encoding a reference waveform of a first speaker in a feature separation encoder of a processor-based machine learning system to obtain an encoded style feature separated from a second speaker, wherein the feature separation encoder implements a feature separation algorithm based on entropy minimization utilizing pair-wise weights computed between features of respective pairs of multiple speakers;
transferring in a synthesizer of the processor-based machine learning system the encoded style feature to a spectrogram obtained by encoding an input text in a text encoder of the synthesizer, to obtain a style transferred spectrogram; and
converting the style transferred spectrogram into a time-domain speech waveform in a vocoder of the processor-based machine learning system;
wherein encoding the reference waveform of the first speaker to obtain the encoded style feature separated from the second speaker comprises:
inputting a feature of the second speaker, an output of a speaker encoder from the first speaker encoded by the speaker encoder, and an output of the synthesizer obtained by passing a random text through the synthesizer, into the feature separation encoder as inputs; and
performing feature learning based on the feature separation algorithm in the feature separation encoder, and encoding the reference waveform of the first speaker, to obtain the encoded style feature separated from the second speaker.

9. The electronic device according to claim 8, wherein encoding the reference waveform of the first speaker comprises:
generating a vector of a predetermined dimension from the reference waveform of the first speaker.

10. The electronic device according to claim 9, wherein encoding the reference waveform of the first speaker further comprises:
calculating, from the vector, a loss value based on the feature separation algorithm, wherein the loss value is based on a feature sub-graph of the first speaker and a feature sub-graph of the second speaker; and
encoding the reference waveform of the first speaker based on the loss value.

11. The electronic device according to claim 8, wherein the second speaker and the first speaker are close to each other in space and have features with the same distribution variance.

12. The electronic device according to claim 10, wherein a loss function of the feature sub-graph of the first speaker is based on the loss value.

13. The electronic device according to claim 8, wherein the actions further comprise:
inputting the output of the speaker encoder, after being subject to a linear projection, into the synthesizer; and
inputting an output of the synthesizer, after being sampled, to the speaker encoder.

14. The electronic device according to claim 8, wherein:
the second speaker and the first speaker speak in the same conversation scenario.

15. A computer program product tangibly stored in a non-transitory computer-readable medium and comprising computer-executable instructions, wherein the computer-executable instructions, when executed by a computer, cause the computer to perform actions comprising:
- encoding a reference waveform of a first speaker in a feature separation encoder of a processor-based machine learning system to obtain an encoded style feature separated from a second speaker, wherein the feature separation encoder implements a feature separation algorithm based on entropy minimization utilizing pair-wise weights computed between features of respective pairs of multiple speakers;
- transferring in a synthesizer of the processor-based machine learning system the encoded style feature to a spectrogram obtained by encoding an input text in a text encoder of the synthesizer, to obtain a style transferred spectrogram; and
- converting the style transferred spectrogram into a time-domain speech waveform in a vocoder of the processor-based machine learning system;
- wherein encoding the reference waveform of the first speaker to obtain the encoded style feature separated from the second speaker comprises:
- inputting a feature of the second speaker, an output of a speaker encoder from the first speaker encoded by the speaker encoder, and an output of the synthesizer obtained by passing a random text through the synthesizer, into the feature separation encoder as inputs; and
- performing feature learning based on the feature separation algorithm in the feature separation encoder, and encoding the reference waveform of the first speaker, to obtain the encoded style feature separated from the second speaker.

16. The computer program product according to claim 15, wherein encoding the reference waveform of the first speaker comprises:
- generating a vector of a predetermined dimension from the reference waveform of the first speaker.

17. The computer program product according to claim 16, wherein encoding the reference waveform of the first speaker further comprises:
- calculating, from the vector, a loss value based on the feature separation algorithm, wherein the loss value is based on a feature sub-graph of the first speaker and a feature sub-graph of the second speaker; and
- encoding the reference waveform of the first speaker based on the loss value.

18. The computer program product according to claim 15, wherein the second speaker and the first speaker are close to each other in space and have features with the same distribution variance.

* * * * *